(12) United States Patent
Wang et al.

(10) Patent No.: US 11,174,182 B2
(45) Date of Patent: Nov. 16, 2021

(54) SYSTEM FOR PREVENTING AND CONTROLLING HEAVY METALS AND METHOD FOR PREVENTING AND CONTROLLING HEAVY METALS USING THE SAME

(71) Applicant: CHINESE RESEARCH ACADEMY OF ENVIRONMENTAL SCIENCES, Beijing (CN)

(72) Inventors: Lei Wang, Beijing (CN); Beidou Xi, Beijing (CN); Jinsheng Wang, Beijing (CN); Ming Chang, Beijing (CN); Yangyang Wang, Beijing (CN); Tongtong Li, Beijing (CN); Yali Zhang, Beijing (CN); Hui Liu, Beijing (CN); Feng Wu, Beijing (CN); Qian Zhang, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 0 days.

(21) Appl. No.: 16/770,773

(22) PCT Filed: Dec. 12, 2018

(86) PCT No.: PCT/CN2018/120542
§ 371 (c)(1),
(2) Date: Jun. 8, 2020

(87) PCT Pub. No.: WO2019/114744
PCT Pub. Date: Jun. 20, 2019

(65) Prior Publication Data
US 2020/0399157 A1    Dec. 24, 2020

(30) Foreign Application Priority Data
Dec. 13, 2017    (CN) .......................... 201711330935.6

(51) Int. Cl.
*C02F 3/32*    (2006.01)
*C02F 3/34*    (2006.01)
(Continued)

(52) U.S. Cl.
CPC ................ *C02F 3/32* (2013.01); *C02F 3/341* (2013.01); C02F 2101/105 (2013.01); C02F 2101/16 (2013.01); C02F 2101/20 (2013.01)

(58) Field of Classification Search
CPC ...... C02F 3/32; C02F 3/341; C02F 2101/105; C02F 2101/16; C02F 2101/20;
(Continued)

(56) References Cited

U.S. PATENT DOCUMENTS

| 6,858,142 | B2* | 2/2005 | Towndrow | .............. | C02F 3/327 |
| | | | | | 210/602 |
| 2003/0024874 | A1* | 2/2003 | Wallace | .................. | C02F 3/306 |
| | | | | | 210/602 |

(Continued)

FOREIGN PATENT DOCUMENTS

| CN | 101481194 | A | * | 7/2009 |
| CN | 102633362 | A | * | 8/2012 |
| CN | 106111062 | A | * | 11/2016 |

OTHER PUBLICATIONS

Machine-generated English Translation of CN102557348, dated Apr. 2, 2021.*
(Continued)

*Primary Examiner* — Fred Prince
(74) *Attorney, Agent, or Firm* — CBM Patent Consulting, LLC

(57) ABSTRACT

It discloses a system for controlling heavy metals and a method for preventing and controlling heavy metals using the same. The system includes a constructed wetland (3), in which several layers of fillers are laid, so that water is
(Continued)

allowed to flow through each layer of the filler to remove heavy metals. Preferably, a sandwich wall is constructed around the constructed wetland (3), and organic matters (12) which generating heat through fermentation is filled in the sandwich wall to supply heat to the constructed wetland (3) in winter. The sandwich wall is easy to build and the fermentation materials are cheap and easily available, thereby the present method is able to effectively solve the difficulties occurred in the operation of constructed wetland in winter.

13 Claims, 1 Drawing Sheet

(51) Int. Cl.
  *C02F 101/10* (2006.01)
  *C02F 101/16* (2006.01)
  *C02F 101/20* (2006.01)
(58) Field of Classification Search
  CPC ...... C02F 1/283; C02F 1/281; C02F 2305/10; C02F 2305/023; C02F 2101/30; C02F 1/725; C02F 3/308; C02F 3/327; C02F 3/34; Y02W 10/10
  USPC ....... 210/602, 615, 616, 617, 290, 912, 913, 210/914, 906
  See application file for complete search history.

(56) References Cited

U.S. PATENT DOCUMENTS

| | | | |
|---|---|---|---|
| 2004/0031753 A1* | 2/2004 | Herman | C02F 1/288 210/617 |
| 2012/0223029 A1* | 9/2012 | Smith | C02F 1/281 210/807 |

OTHER PUBLICATIONS

Machine-generated English Translation of CN106111062, dated Apr. 5, 2021.*
Machine-generated English Translation of CN101481194, dated Apr. 5, 2021.*

* cited by examiner

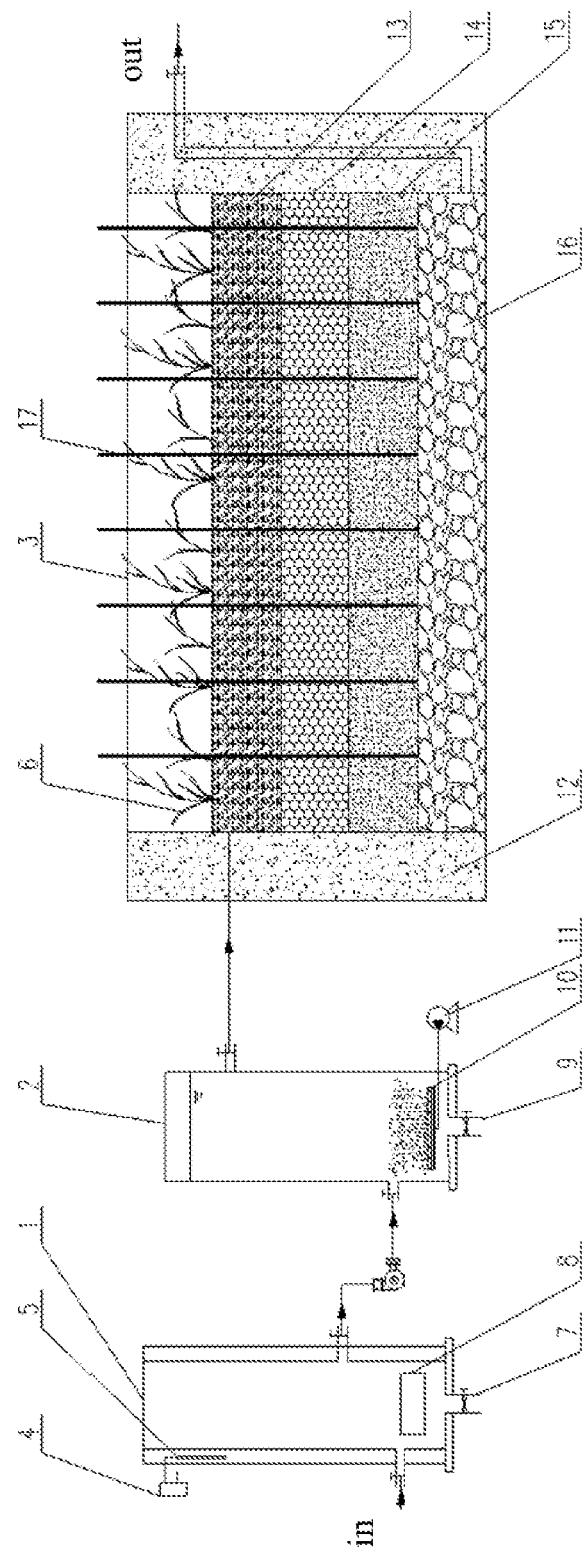

SYSTEM FOR PREVENTING AND CONTROLLING HEAVY METALS AND METHOD FOR PREVENTING AND CONTROLLING HEAVY METALS USING THE SAME

TECHNICAL FIELD

The invention belongs to the field of water recourses cycling utilization, and particularly relates to a system for preventing and controlling heavy metals and a method for preventing and controlling heavy metals using the same in the irrigation process of extremely water-scarce farmland.

BACKGROUND ART

Water shortage has become one of the important factors restricting China's social and economic development. According to agricultural experts, agricultural water, especially irrigation water, must increase by 15% to 20% over the next 25 years in order to maintain the food security of a growing world population and reduce famine and rural poverty. Due to the shortage of water resources, the untreated water is generally drawn directly from the water source and introduced into the farmland. Although this method is simple in operation and has a large amount of water diversion, when the water source is contaminated, it will directly pollute the farmland. The farmland is an important carrier for plant growth, and the farmland soil health directly determines the level of food safety and greenness. If farmland soil is contaminated, the "rice bags" and "vegetable baskets" on which people live will inevitably be seriously affected.

Whether the heavy metal content in farmland soil exceeds the standard or causes pollution is directly related to the quality and safety of agricultural products and the health of humans and animals. The effective prevention and control of heavy metal pollution in farmland soil is undoubtedly the content of cultivated soil quality and an important evaluation index. The control of irrigation water quality in extremely water-scarce areas is the leading issue in agriculture and environmental protection industry today, and the content of heavy metals is crucial in the indicators of irrigation water quality. The prevention and control technology of heavy metals in the irrigation process of extremely water-scarce farmland is a necessary means of food safety today.

CONTENTS OF THE INVENTION

In order to solve the above problems, the present inventors have conducted intensive studies, and provide a method and a system for preventing and controlling heavy metals in the irrigation process of extremely water-scarce farmland, thereby the problem of excessive standards of heavy metals in irrigation water is effectively solved, and the water treatment is not affected by the negative impact of winter and can be carried out continuously throughout the year, thereby reducing the serious accumulation of heavy metals in plants, maintaining good condition of farmland, ensuring agricultural safety and human safety, and thus completing the present invention.

The object of the present invention is to provide the following technical solutions:

(1) A system for preventing and controlling heavy metals, wherein the system includes a constructed wetland 3, in which several layers of fillers are laid, so that water is allowed to flow through each layer of the filler to remove heavy metals, and preferably the system is suitable for preventing and controlling of heavy metals in the irrigation process of extremely water-scarce farmland;

preferably, the constructed wetland 3 is provided with four layers of fillers from top to bottom:

the first layer of filler 13 is a mixed filler of soil and functional biochar, the mixing weight ratio is 3:(6~8), and preferably the particle size of the filler is 0.10-0.30 cm;

the second layer of filler 14 is a mixed filler of soil, natural zeolite and limestone, the mixing weight ratio is 1:(2~3):(0.5~1), and preferably the particle size of the filler is 0.08-0.1 cm;

the third layer of filler 15 is a mixed filler of fly ash molecular sieve, Flory diatomaceous earth and biochar, the mixing weight ratio is 1:(3~4):(1~1.5), and preferably the particle size of the filler is 0.05-0.08 cm;

the fourth layer of filler 16 is a mixed filler of pebbles and biochar, which adsorbs heavy metals, the mixing weight ratio is 1:(1~2), and preferably the particle size of the filler is 0.30-0.50 cm;

more preferably a sandwich wall is built around the constructed wetland 3 to close the surrounding of the constructed wetland 3, and the interior of the sandwich wall is hollow, in which organic matters 12 which generating heat through fermentation is filled to generate heat by fermentation to supply heat to the constructed wetland 3.

(2) A method for preventing and controlling heavy metals by using the system according to (1).

According to the present invention, a system for preventing and controlling heavy metals and a method for preventing and controlling heavy metals using the same have the following beneficial effects:

(1) The constructed wetland in the present invention is constructed by laying multiple layers of fillers, and the types of fillers, dosage ratio, particle size and filling height of filler in each layer are specifically selected, so that heavy metal adsorption, suspended matter filtration, organic matter degradation, dephosphorization and denitrification, can be effectively realized in the constructed wetland.

(2) In the present invention, specific wetland plants are planted in the constructed wetland, which is beneficial to the enrichment of heavy metals, and the obtained aquatic plants enriched with heavy metals can be reused to prepare functional biochar with photocatalytic effect and electrochemical redox reaction.

(3) Denitrifying bacteria and phosphorus-accumulating bacteria are added in the constructed wetland, thereby nitrogen and phosphorus in water can be removed, and the biofilm is formed on the surface of the filler, and the content of heavy metals is reduced through flocculation of the biofilm. Moreover, the airway tube is inserted in the constructed wetland, which facilitates air to enter into the aerobic layer of the constructed wetland and promotes the reproduction of aerobic microorganisms.

(4) A sandwich wall is constructed around the constructed wetland, and organic matters which generating heat through fermentation are filled in the sandwich wall to supply heat to the constructed wetland in winter. The sandwich wall is easy to build, and the fermentation materials are cheap and easily available, thereby the present method is able to effectively solve the difficulties occurred in the operation of the constructed wetland in winter.

(5) Water distribution pipes, water collection pipes and water outlets are set in the constructed wetland, which are convenient for the formation of the winter thermal insulation layer (ice layer-air layer). Meanwhile, the smooth circulation and conversion of water can be realized by diameters of the water distribution pipe and water collection pipe, pore density and pore diameter.

(6) In the present invention, the system also includes an ablation sedimentation tank and a nano-aeration tank. The introduced aquatic plants are converted into a carbon sources with short carbon chains through the acidification and degradation of the ablation sedimentation tank and the oxidative degradation of the nano-aeration tank. Therefore, a carbon source can be provided to microorganisms in the constructed wetland to promote reproduction under the premise that the water quality treated by the constructed wetland meets the requirements of irrigation.

DESCRIPTION OF FIGURES

FIG. 1 shows a schematic diagram of the system for preventing and controlling heavy metals according to a preferred embodiment of the present invention.

DESCRIPTION OF THE REFERENCE SIGNS

1—ablation sedimentation tank;
2—nano-aeration tank;
3—constructed wetland;
4—temperature control device;
5—temperature probe
6—wetland plant
7—sludge discharge hole
8—agitator
9—secondary sludge discharge hole
10—aeration disk
11—nano-aerator
12—organic matters
13—first layer of filler
14—second layer of filler
15—third layer of filler
16—fourth layer of filler
17—airway tube

SPECIFIC EMBODIMENTS FOR CARRYING OUT THE INVENTION

The present invention will be described in more detail through preferred embodiments and examples. Through these descriptions, the features and advantages of the present invention will become clearer.

The term "exemplary" as used herein is intended to be "serving as an example, an illustrative embodiment, or an embodiment". Any of the embodiments described herein as "exemplary" need not be construed as preferred as or better than other embodiments. Although various aspects of the examples are shown in the figures, unless specifically noted, the figures are not necessarily drawn to scale.

Aiming at the problem of water pollution affecting farmland during the irrigation process of extremely water-scarce farmland in China, a system for preventing and controlling heavy metals in the irrigation process of extremely water-scarce farmland is proposed, as shown in FIG. 1, to effectively control the content of heavy metals in water fed into the farmland.

In the present invention, the system includes a constructed wetland 3, in which several layers of fillers are laid, so that water is allowed to flow through each layer of the filler to remove heavy metals.

In the present invention, the constructed wetland 3 is provided with three to six layers of fillers from top to bottom, and the filler of each layer may be selected from one or more of soil, biochar, functional biochar, ore particles such as gravel, natural zeolite, volcanic stone, calcite, limestone, pebbles, and so on, diatomaceous earth or Flory diatomaceous earth.

In a preferred embodiment, the constructed wetland 3 is provided with four layers of fillers from top to bottom:

the first layer of filler 13 is a mixed filler of soil and functional biochar;

the second layer of filler 14 is a mixed filler of soil, natural zeolite and limestone;

the third layer of filler 15 is a mixed filler of fly ash molecular sieve, Flory diatomaceous earth and biochar;

the fourth layer of filler 16 is a mixed filler of pebbles and biochar.

In the present invention, the first layer of filler 13 is laid at 0-500 cm, and the first layer of filler 13 is a mixed filler of soil and functional biochar, and the mixing ratio is 3:(6~8), and preferably 3:7.

Wherein, biochar is a material with high-carbon-content obtained from biomass after high temperature treating and deoiling under anoxic conditions. Functional biochar is biochar loaded with transition metals. Functional biochar has the following characteristics of biochar:

(1) In term of microstructure, it has characteristics of porosity. The large pores can ensure the aeration and water retention capacity of the soil used with it, and also provide a place for microorganisms to survive and reproduce, thereby improving the activity and reproduction rate of the microorganisms; micropores and small pores affect the adsorption and transfer of molecules by biochar, and the pore structure of biochar can reduce the rate of water penetration and enhance the adsorption capacity of soil for nutrients that are highly mobile and easily leached. Thus, the porous structure is conducive to the growth of wetland plants on the first layer of filler.

(2) The porosity of biochar determines its large surface area, and a large amount of organic matters in the regional water can be adsorbed, which is conducive to the degradation of organic matters after adsorption and reduce the content of organic matters with long carbon chains in water.

(3) The surface of the biochar has carboxyl, phenolic hydroxyl, and carbonyl oxygen-containing functional groups. The biochar has higher cation exchange capacity because of negative surface charges generated by the above functional groups, and thus can effectively adsorb heavy metal ions in basin water.

(4) In addition to the above-mentioned characteristics of biochar, functional biochar is loaded with transition metals (such as nickel, cobalt and iron), therefore water molecules or hydroxides adsorbed on the surface of functional biochar are oxidized in the presence of oxygen through the photo-catalysis of transition metals to generate active oxygen such as hydroxyl radical ($\cdot OH$), and thus organic pollutants are degraded, desulfurized (S), and dechlorinated (Cl), thereby reducing their toxicity and odor. Meanwhile, the dissolved metal ions are reduced to insoluble metal atoms by the loaded transition metal through the electrochemical oxidation-reduction reaction and catalysis, and then are plated on the surface of the functional biochar medium to achieve heavy metal removal.

In the present invention, the first layer of filler 13 is mainly composed of the functional biochar, and the soil is added as an auxiliary, which is beneficial to the planting of the plants on the first layer of filler 13. After experiments, it is found that when the soil and the functional biochar were mixed with a weight ratio of 3:(6~8), good growth of plants could be achieved due to the fixation of the activated carbon to the soil, and a large amount of organic matters can be absorbed by the filler with the functional biochar as main part, then be effectively degraded through the photocatalysis of transition metal ions. Moreover, the removal effect of heavy metals is also significant. If the weight ratio of soil to functional biochar is less than 3:8, namely the ratio of soil decreases, plant growth is affected due to lack of necessary nutrients. If the weight ratio of soil to functional biochar is more than 3:6, the effects of photocatalysis and electrochemical oxidation-reduction reaction are reduced, and the porous structure decreased, therefore the degradation efficiency of organic matters and the adsorption of heavy metal decrease.

In a further preferred embodiment, the particle size of the filler in the first layer of filler 13, especially of the functional biochar, is 0.10-0.30 cm. Within this particle size range, the support of functional biochar to the soil is beneficial for air to enter the filler layer, and the plant roots are effectively contacted with air, which is beneficial to the growth of wetland plants planted on the first layer of filler 13. If the particle size of the functional biochar is less than 0.10 cm, it is unfavorable for air to enter the filler layer, and is also unfavorable for plant growth and degradation of organic pollutants because of the lack of oxygen. If the particle size of the functional biochar is greater than 0.30 cm, the larger particle size is not conducive to the efficiencies photocatalysis and electrochemical oxidation-reduction reaction due to small surface area.

In a further preferred embodiment, wetland plants 6, preferably canna and reed, are planted on the first layer of filler 13. Canna and reed show extremely high enrichment capacity for heavy metals, and the accumulation of heavy metals in the two plants is more than 100 times that of ordinary aquatic plants, while their normal growth is not affected. Heavy metals can be completely removed from the water body by harvesting plants. Therefore, both of the wetland plants are selected for planting, which is an effective ecological method for reducing heavy metals. Canna and reed can grow normally in eutrophic water bodies, showing good water purification effects. Suspended matters in water can be effectively reduced through plant absorption, volatilization, root filtration, degradation, stabilization and so on.

In the present invention, the functional biochar in the constructed wetland 3 is prepared by biomass enriched with heavy metals. In an embodiment, functional biochar can be obtained by carbonizing, activating, deoiling, reducing and drying the wetland plants 6 (reed and canna) grown in the constructed wetland 3.

In another embodiment, the wetland plants 6 with heavy metal enrichment function are cultured in the culture solution with high content of heavy metals. Wherein, the culture solution contains copper chloride, zinc chloride, and nickel chloride, with a molar ratio of copper chloride:zinc chloride: nickel chloride=32:9:9. The obtained wetland plants 6 are enriched with copper, zinc and nickel, and then are carbonized at 900-1600° C., activated by zinc chloride to deoil, reduced by sodium borohydride and dried to obtain functional biochar.

During the growth process of plants, heavy metals are continuously absorbed, and plant biomass that absorbs heavy metals is burned into activated carbon, so heavy metals are embedded in plant carbon fibers as extremely stable connection, rather than bonded to the carbon structure. The load of heavy metals in biochar far exceeds the existing load mode, and biochar has higher electric capacity and photocatalytic ability.

In the present invention, the second layer of filler 14 is laid at 500-1000 cm, and the second layer of filler 14 is a mixed filler of soil, natural zeolite and limestone, with the mixing ratio of 1:(2~3):(0.5~1), and preferably 1:2:0.5.

Zeolite is a water-containing porous aluminosilicate with a crystal structure mainly composed of (SiO) tetrahedron. The overall framework of the zeolite molecule is formed by $Al^{3+}$ and $Si^{4+}$ ions and oxygen atoms together, and part of $Si^{4+}$ is replaced by $Al^{3+}$, resulting in excess negative charge. At the same time, there are cavities and channels in the zeolite framework with certain pore size, which determines its adsorption and ion exchange properties. Zeolite adsorbs ammonia nitrogen and adsorbs and fixes heavy metals with greater advantage than other ore raw materials.

Limestone also has more pore structures, so it can effectively adsorb heavy metals. At the same time, the acidity and alkalinity of water can be effectively regulated by limestone, and it plays an important role in the growth of plants in the upper filler. If microorganisms are added to the constructed wetland to simultaneously remove other pollutants such as nitrogen and phosphorus, limestone also plays an important role in the growth of plants in the reproduction of microorganisms in water (phosphorus-accumulating bacteria multiply at pH 5~pH 9, and nitrifying bacteria and denitrifying bacteria multiply at pH 6.0~pH 8.5).

The soil also provides support for wetland plants 6 in constructed wetlands. At the same time, studies have shown that due to the presence of clay minerals, oxides and organic matters in the soil, the soil has a tendency to enrich heavy metals, which making its ability of adsorbing heavy metal ions not to be underestimated.

After a lot of experimental research, the mixing ratio of the soil, natural zeolite and limestone in the second layer of filler 14 is 1:(2~3):(0.5~1). Within this range, the adsorption and fixation of most heavy metals and the adjustment of the pH value of water can be realized. If the proportion of soil increases, the adsorption capacity of heavy metals decreases due to the weaker adsorption effect of soil to heavy metals than those of natural zeolite and limestone. On the contrary, nutrient reserves of plant growth may be affected. If the proportion of the natural zeolite increases, the adsorption of heavy metals increases, and correspondingly the amount of soil or limestone decreases, which also has a threat to plant growth or the regulation of the pH value of water. Similarly, the increase of the proportion of limestone is beneficial to the adjustment of the pH value of water, but the effect of other components is reduced accordingly. On the contrary, the pH value of water cannot be adjusted quickly and effectively, thereby affecting the functional activities of microorganisms.

In a further preferred embodiment, the particle size of the filler in the second layer of filler 14 is 0.08-0.1 cm. This particle size range is chosen under considering the coordination of gas circulation and total metal adsorption. When the particle size is less than 0.08 cm, although the adsorption of heavy metals is promoted, it is not beneficial to the phosphorus accumulation of the phosphorus-accumulating bacteria placed in the third layer of filler 15 due to increased packing density, poor air circulation and low oxygen content in water. When the particle size is higher than 0.1 cm, air circulation is promoted, but corresponding heavy metal adsorption capacity is significantly reduced compared to that with particle size of 0.08 cm.

In a preferred embodiment of the present invention, the third layer of filler 15 is laid at 1000~1500 cm, and the third layer of filler 15 is a mixed filler of fly ash molecular sieve, Flory diatomaceous earth and biochar with the mixing ratio of 1:(3~4):(1~1.5), and preferably 1:3:1.

In the present invention, three kinds of porous fillers, namely fly ash molecular sieve, Flory diatomaceous earth and biochar are used to adsorb heavy metals in the deep layer of the constructed wetland. The common feature of these porous fillers is the high porosity, which is convenient for the biofilm formation of microorganisms. Wherein, fly ash is used as a molecular sieve, based on the fact that the main components of fly ash are similar to those of molecular sieves. Fly ash is currently treated as waste, because it contains heavy metal ions, such as Cr, Hg, As and Pb, and will pollute air, water, soil and so on. If fly ash is used as molecular sieve, its cation exchange characteristics and pore structure are beneficial to achieve the adsorption of heavy metals, thereby the source of pollution is used effectively.

Biochar with large surface area also has excellent heavy metal adsorption capacity.

Compared with ordinary diatomaceous earth, Flory diatomaceous earth has larger pore volume, larger specific surface area, and stronger adsorption of heavy metals and organic pollutants. In particular, Flory diatomaceous earth has a depth effect, that is, in deep filtration, the separation process only occurs in the "inside" of the medium, and some of the relatively small impurity particles that pass through the surface of Flory diatomaceous earth are blocked by the tortuous micropore structure and the finer pores inside diatomaceous earth. When the particles hit the wall of the channel, it is possible to escape from the flow. The nature of Flory diatomaceous earth is beneficial to the long-term retention of bacterial microorganisms in this area, which facilitates the placement of microorganisms. If microorganisms are added to water, a large number of biological flocculants are generated through the biofilm formation of microorganisms to flocculate the heavy metals.

Since the fly ash molecular sieve, Flory diatomaceous earth and biochar have different adsorption advantages for different heavy metals, the mixing ratio of fly ash molecular sieve, Flory diatomaceous earth and biochar is 1:(3~4):(1~1.5), which is beneficial to the placement of microorganisms, thereby improving the adsorption of various heavy metal ions.

In a preferred embodiment, the particle sizes of fly ash molecular sieve, Flory diatomaceous earth and biochar are 0.05-0.08 cm. Due to the high porosity of the above three fillers, it is beneficial to the adsorption of heavy metal ions and the biofilm formation of microorganisms.

In a preferred embodiment of the present invention, the fourth layer of filler 16 is laid at 1500~2000 cm, the fourth layer of filler 16 is a mixed filler of pebbles and biochar with the mixing weight ratio of 1:(1~2), and preferably 1:1. Pebbles also have the ability of adsorbing heavy metals, and are cooperated with biochar to synergistically adsorb heavy metals. Preferably, the particle size of the filler in the fourth layer of filler 16 is 0.30-0.50 cm. Larger gaps will be formed between the fillers due to their larger particle size, which is beneficial to fluid flow, collection and transmission to constructed wetlands.

The thicknesses of the first layer of filler 13, the second layer of filler 14, the third layer of filler 15 and the fourth layer of filler 16 are all 500 cm, and the total thickness of the fillers is 2000 cm. Said thickness is the most preferable to effectively implement the function of each filler layer. The thickness of the first layer of filler 13 is from 100 to 700 cm, the thickness of the second layer of filler 14 is from 300 to 700 cm, the thickness of the third layer of filler 15 is from 200 to 600 cm, and the thickness of the fourth layer of filler 16 is from 100 to 600 cm.

It is found that the efficient removal of heavy metals in water can be realized by the constructed wetland in the spring, summer, and autumn, while in winter, the efficiency of removing heavy metals in the constructed wetland is significantly reduced or even not operational because of the low temperature. The reason lies mainly in local or most freeze in the constructed wetland caused by the low temperature in winter, and water cannot flow through the multi-layer filler to adsorb heavy metals. Meanwhile, the activity of microbial enzymes in the constructed wetland is decreased due to the low temperature, and the growth and reproduction are inhibited, therefore heavy metals cannot be removed by flocculation of the biofilm.

Based on the above, the inventors conducted a lot of research, and provided a heating device for realizing the operation of the constructed wetland in winter with less operation difficulty and lower cost.

In the present invention, a sandwich wall is built around the constructed wetland 3 to close the surrounding of the constructed wetland 3. The interior of the sandwich wall is hollow, in which organic matters 12 which generating heat through fermentation are filled to supply heat to the constructed wetland 3 in winter.

In a preferred embodiment, organic matters 12 which generating heat through fermentation are crop straw. Therefore, while heat is provided to the constructed wetland, the nutritional value and palatability of the straw are improved through fermentation. The products after fermentation can be used as basic feed or feed ingredients for animal breeding. Alternatively, organic matters 12 which generating heat through fermentation are a mixture of feces, wetland plants and activated sludge. Wetland plants can be collected from the constructed wetland, therefore the source of raw materials is convenient. Moreover, the fermentation can be efficiently promoted by a large number of various types of microorganisms after adding feces and activated sludge.

In a preferred embodiment, the height of organic matters 12 is slightly higher than that of the second layer of filler 14 in the constructed wetland, and does not exceed that of the first layer of filler 13. Within this height range, heat is concentratedly transported to the constructed wetland 3, thereby avoiding increasing the amount of organic matters 12 and directly transporting heat to the air due to the height exceeding the first layer of filler 13, and also avoiding the reduction of heavy metal removal effectiveness due to insufficient heat supply caused by low amount of organic matters 12.

In the present invention, the top of the sandwich wall is open or sealed. Preferably, the top of the sandwich wall is sealed, and an exhaust pipe is set on the top of the sandwich wall. The exhaust pipe is connected to the water tank to allow hot air in the sandwich wall to feed into the water tank, and transport water in the water tank to the constructed wetland 3, thereby providing heat to the constructed wetland 3 by heating water in the water tank. The heat entrained in the gas produced by fermentation is effectively used by this method. More preferably, the top of the sandwich wall is insulated by covering wetland plants, such as reeds, with a thickness of 0.1-0.2 m. Wetland plants are easy to obtain, do not need to be closed by construction, and can be opened or closed at any time with simple operation.

In the present invention, the constructed wetland 3 is provided with water distribution pipes and water collection pipes on both sides along its length. The water distribution pipes are located at the top of the filler layer and the water collection pipes are at the bottom of the filler layer, and the water collection pipe passes through the sandwich wall to output water from the constructed wetland 3.

In a preferred embodiment, the outlet of the water collection pipe is higher than the height of the filler layer in the constructed wetland 3.

During the operation of the constructed wetland in winter, water is fed from the outlet of the water collection pipe. When water exceeds the water distribution pipe by about 1 m, the water intake is stopped, so that 0.4-0.6 m of an ice layer and an air insulation layer are formed outside the filler layer of the constructed wetland 3 (The height of organic matter 12 is adjusted to make the ice layer not melt). When the water to be treated is transported by the water distribution pipe, the water is not freezed, which is beneficial to maintain the temperature of the water and the living activities of microorganisms.

It can be seen that the water outlet is higher than the height of the filler layer of the constructed wetland, thereby the length of the water collection pipe passed through the sandwich wall can be increased, and the temperature of the water passed through the water collection pipe can be improved, so that water is not easy to freeze. When water is fed through the water collection pipe, the height of the water inlet is conducive to water flowing into the constructed wetland 3.

In the present invention, both the water distribution pipe and the water collection pipe are made of PVC (polyvinyl chloride). PVC is a hard material, stable to organic acids, inorganic acids, alkalis and salts, and has long service life in water treatment environment, thus is suitable for the constructed wetland 3. Preferably, both the water distribution pipe and the water collection pipe are made of DN100 mm-DN120 mm PVC (DN refers to the nominal diameter). Water is evenly distributed by the water distribution pipe with a hole every 10-20 cm, and the diameter of the hole is 1-3 cm. The water collection pipe is provided with a water collection hole along the length of the constructed wetland 3 corresponding to the middle section of the filler, and a water collection hole is provided every 5-10 cm, and the diameter of the water collection hole is 1-3 cm. The location of the water collection hole in the water collection pipe is used to receive water flowed through the filler with a long path, and heavy metals in collected water are removed to a large extent. At the same time, the smooth circulation and conversion of water can be realized because of the above-mentioned pipe diameter, hole density and diameters of the water distribution pipe and the water collection pipe.

In the present invention, the sandwich wall, the water distribution pipe, the water collection pipe and the water outlet are set to effectively ensure the operation of the constructed wetland in winter, thereby the water can be continuously processed.

As we know, in addition to heavy metal pollution, the nitrogen content, phosphorus content and suspended matters in water are increased due to the discharge of domestic sewage, and refractory organic pollutants are increased due to the industrial discharge. These pollutants flow into the farmland with water, which may cause farmland compacting and smelling bad, and affect crop growth.

In the present invention, heavy metals, suspended matters and organic matters can be adsorbed layer by layer through the multi-layer filler of the constructed wetland 3, and organic matters with long carbon chains can be degraded by functional biochar in the first layer of filler 13 through photocatalysis, thereby reducing the pollution of organic matters to the farmland. Nitrogen and phosphorus are essential elements for plants, and appropriate amount of phosphorus and nitrogen fertilizers are required for the growth of plants. The phosphorus in the phosphorus fertilizer and the nitrogen in the nitrogen fertilizer are absorbed by the plants in the form of acid radical ions. However, only a part of the fertilizer applied to the soil is absorbed by the crops of the season, and the rest is fixed by the soil to form large amount of acidic salt deposits, causing soil compaction. Therefore, after extensive research, the aerobic zone (the first, second and third layers of filler zone) and anaerobic zone (the fourth layer of filler zone) are set up in the constructed wetland 3, and phosphorus-accumulating bacteria and denitrifying bacteria are add, thereby effectively solving the problem of excessive nitrogen and phosphorus.

In the present invention, a polar polymer film, such as polyaniline film, is filled between the third layer of filler 15 and the fourth layer of filler 16. The polar polyaniline film has unique functions of water permeability and air impermeability. Therefore, water and microorganisms are allowed to circulate between the third layer of filler 15 and the fourth layer of filler 16, while the upper layer of oxygen-containing gas is prevented from entering the fourth layer of filler 16.

In a preferred embodiment, phosphorus-accumulating bacteria is added in the third layer of filler 15 to reduce the phosphorus content of basin water to be purified. Said phosphorus-accumulating bacteria are selected from one or more of *Acinetobacter*, *Aeromonas* and *Pseudomonas*, and preferably *Pseudomona alcaligenes*.

Under aerobic conditions, free oxygen is used as the electron acceptor by phosphorus-accumulating bacteria to oxidize β-hydroxybutyric acid (PHB) stored in cells, and the energy generated by this reaction is used to excessively take up phosphate from water to synthesize the high-energy substance adenosine triphosphate (ATP), wherein a part of which is provided for bacterial synthesis and life-sustaining activities, and another part of which is used to synthesize polyphosphate which accumulating in bacterial cells. Under anaerobic conditions, the phosphorus-accumulating bacteria decompose the polyphosphate in the body and produce ATP. Phosphorus is released by the phosphorus-accumulating bacteria under anaerobic conditions. The amount of aerobic phosphorus accumulating is greater than that of anaerobic phosphorus releasing, thus the phosphorus content of basin water can be effectively controlled by inputting the phosphorus-accumulating bacteria.

In a further preferred embodiment, the fourth layer of filler 16 is an anoxic or anaerobic environment, and anaerobic denitrifying bacteria, preferably heterotrophic anaerobic denitrifying bacteria, are added to the fourth layer of filler 16. $NO_3^-$ can be gradually converted to $NO_2^-$, NO, $N_2O$ and $N_2$ by the denitrifying bacteria, and gets out of the water system, thereby achieving the purpose of denitrification. Although certain nitrifying bacteria and denitrifying bacteria are present in basin water, some denitrifying bacteria are added in basin water in present invention to further improve the denitrification efficiency.

In a further preferred embodiment, a plurality of airway tubes 17 with vent holes on the wall are longitudinally inserted in the constructed wetland 3. Preferably, the airway tube 17 is inserted into the area from the first layer of filler 13 to the third layer of filler 15, so that gas is exchanged between the inside of the filler layer and the outside thereof. Moreover, oxygen-containing gas is introduced into the area from the first layer of filler 13 to the third layer of filler 15 through the airway tube 17, which is beneficial to the life activities of aerobic bacteria.

In the present invention, phosphorus-accumulating bacteria and denitrifying bacteria are introduced into the constructed wetland 3. A carbon source is required with the growth of microorganisms, especially a carbon source with short chains is more convenient for the absorption and utilization of microorganisms. However, the content of short-chain carbons is small in water, thus the growth and reproduction of microorganisms placed in the constructed wetland 3 are bound to be affected.

Therefore, the system of the present invention further includes an ablation sedimentation tank 1 and a nano-aeration tank 2, which provide organic matters with short-chain carbon to the constructed wetland 3, wherein, the ablation sedimentation tank 1 and the nano-aeration tank 2 are connected to the constructed wetland 3 in sequence.

Water to be treated and aquatic plants, such as duckweed and algae, are added into the ablation sedimentation tank 1, and then aquatic plants are acidified and digested, thereafter the supernatant is transported to the nano-aeration tank 2, wherein, said aquatic plants can be salvaged from water to be purified.

The supernatant from the ablation sedimentation tank 1 is received by the nano-aeration tank 2, and organic matters in the supernatant are degraded, such as organic matters with long carbon chains are degraded into short carbon chains, thereafter the degraded supernatant is fed into the constructed wetland 3 to provide microorganisms with carbon source.

The supernatant from the nano-aeration tank 2 is mixed with water to be treated in the constructed wetland 3, and then the pollutants in the constructed wetland are removed.

In the present invention, the temperature in the ablation sedimentation tank 1 is measured by a temperature probe 5 of a temperature control device 4. Preferably, the ablation sedimentation tank 1 is a container with an interlayer. There is a heat transfer medium in the interlayer, so the temperature of the heat transfer medium is measured by the temperature probe 5 of the temperature control device 4 to control the temperature in the ablation sedimentation tank 1.

In the present invention, a sludge discharge hole 7 is set at the bottom of the ablation sedimentation tank 1. The sediment in water is inevitably brought into the ablation sedimentation tank 1 because water to be treated is used to degrade aquatic plants. Moreover, aquatic plants, such as duckweed or algae, are used as raw materials for bacterial growth nutrients, which will inevitably produce waste residue. The setting of the sludge discharge hole 7 facilitates the discharge of the sediment and waste residue.

In a preferred embodiment, the ablation sedimentation tank 1 is equipped with an agitator 8, so that aquatic plants, such as duckweed and algae, can be crushed to speed up the acidification and digestion process. Preferably, when the COD of the supernatant of the ablation sedimentation tank 1 is higher than 200 mg/L, it is considered that the degree of decomposition of duckweed and algae in the ablation sedimentation tank 1 is good.

In the present invention, an aeration disk 10 is set at the lower part of the nano-aeration tank 2, and an oxygen-containing fluid is introduced through the aeration disk 10 into the nano-aeration tank 2. Furthermore, the oxygen-containing fluid is nano-bubble water or the aqueous solution containing tiny bubbles with a size of 100~500 nm, and dissolved oxygen amount of 10~25 mg/L.

Due to the small size and the large specific surface area of the bubbles in the nano-bubble water, they can show characteristics different from ordinary bubbles. For example, the residence time of the bubbles in the device is long due to their small volume. When the bubbles slow rise, both the zeta potential and the specific surface area increase (when ordinary bubbles rise, their volume increases and their specific surface area decreases; while the specific surface area of nano-bubbles increases during they rise, due to a self-pressurizing effect of the internal gas of nano-bubbles because of the surface tension). Active oxygen radicals, such as hydroxyl radicals are generated after the bubbles collapse, thereby efficiently degrading organic matters with long carbon chains in water; and the high temperature generated at the moment of collapse is also conducive to the degradation of organic matters with long carbon chains.

In a preferred embodiment, the diameters of the pores on the aeration disk 10 is nano-scale, that is, the aeration disk 10 is a nano-aeration disk, and it can be set to further ensure the oxygen entering the nano-aeration tank 2 to be nano-sized bubbles. The aeration disk 10 is connected to a nano-aerator 11 through a pipeline. The oxygen-containing fluid is supplied through the nano-aerator 11 to the aeration disk 10.

In the present invention, a secondary sludge discharge hole 9 is set at the bottom of the nano-aeration tank 2 to remove the sludge in water, thereby avoiding blocking pipelines when transferring to the constructed wetland 3.

In a preferred embodiment, microorganisms are added in the nano-aeration tank 2, and said microorganism is *Stenotrophomonas* sp., which belongs to the genus *stenotrophomonas*. *Stenotrophomonas* has unique biochemical activity and metabolic characteristics, and can decompose organic pesticides that are difficult to degrade and have high residues. Organic matters with long carbon chains are used by the bacteria of *Stenotrophomonas* sp. as the carbon source, so the addition of *Stenotrophomonas* sp. can promote the degradation of organic matters with long carbon chains.

In a preferred embodiment, organic matters with long carbon chains can be effectively degraded in the nano-aeration tank 2, so that the average molecular weight of organic matters in water from the nano-aeration tank 2 is lower than 308.24 Da, and preferably lower than 254.50 Da.

Another object of the present invention is to provide a method for preventing and controlling heavy metals in the irrigation process of extremely water-scarce farmland, so as to effectively control the content of heavy metals in water introduced into the farmland by the system described above.

In the present invention, in addition to constructing the ablation sedimentation tank 1, the nano-aeration tank 2 and the constructed wetland 3, water to be treated is also pre-treated by adding denitrifying bacteria, and preferably solid aerobic denitrifying bacteria, such as *Alicaligenes faecalis* or *Thiosphaerapantotropha*.

Preferably, the concentration of solid denitrifying bacteria in water is 5~100 billion/g. It only needs to be inoculated once when basin water is used for irrigation. Water to be treated will inevitably be further purified by the addition of denitrifying bacteria, especially aerobic denitrifying bacteria (Biofilm flocculation and denitrification of heavy metals).

In the present invention, wetland plants 6 planted in the constructed wetland has extremely excellent enrichment effect on heavy metals, so can be used to prepare functional biochar, which may be used as a filler for the constructed wetland.

In another embodiment, the wetland plants 6 (such as canna and reed) with heavy metal enrichment function are cultured in the culture solution with high content of heavy metal. Wherein, the culture solution contains copper chloride, zinc chloride, and nickel chloride, with a molar ratio of copper chloride:zinc chloride:nickel chloride=32:9:9, and then the wetland plants 6 enriched with copper, zinc and nickel are obtained.

In a preferred embodiment of the present invention, the preparation of functional biochar includes the following steps:

step 1, crushing the plants and carbonizing to obtain activated carbon;

step 2, activating the activated carbon to obtain activated carbon after activation;

step 3, reducing the activated carbon after activation to obtain functional biochar.

In step 1, the whole plant is crushed to particles with a length of 3-5 mm as needed.

Argon is filled in a heating vessel, such as a tube muffle furnace, to obtain an inert environment. After a set temperature is reached in the heating vessel, in which the crushed plant particles are fed, thereafter the set temperature is maintained for 120 min, and then the temperature is reduced from the set temperature to 20° C. within 200 min, thereby carbonizing the biomass. Wherein, the set temperature is 900-1600° C.

In step 2, the activated carbon is washed with distilled water until the water is clear after washing. In order to activate, 30-50 wt. % zinc chloride is added to the washed activated carbon until the liquid level is higher than the activated carbon, and the mixture is stirred, microwave radiated for a set time, and then soaked at 25° C. overnight. The activated carbon after activation is washed to neutral, dried and ready for use.

Bio-oil produced by carbonization in step 1 is detached from the internal pores of the activated carbon through the activation, thereby preventing bio-oil from clogging the internal pores of the activated carbon and the decrease of the adsorption and photocatalytic effects.

During the activation, a microwave of 300 W-700 W is used to radiate for 20~30 min.

In step 3, the activated carbon after activation is dried, and a solution of sodium borohydride is added dropwise at a low temperature to reduce the metal ions in the activated carbon, for example, ferrous ions is reduced to iron at zero valence. Preferably, the activation reaction is promoted by shaking at 100-140 rpm with a shaker. The concentration of sodium borohydride solution is 10 mmol/L~30 mmol/L.

The activated carbon is washed with distilled water and dried. After cooling to room temperature, the activated carbon after reduction is filled into a container, sealed, and heated at 180~680° C. in an oven for 10~60 minutes, and then cooled to room temperature to give functional biochar (that is, in situ self-reduction supported activated carbon).

During the growth process of plants, heavy metals are continuously absorbed, and plant biomass that absorbs heavy metals is burned into activated carbon, so heavy metals are embedded in plant carbon fibers as extremely stable connection, rather than bonded to the carbon structure. The load of heavy metals in biochar far exceeds the existing load mode. After the biochar is activated, the ash tar on its surface is removed, and the metal ions are exposed and then is reduced by sodium borohydride, thereby obtaining activated carbon loaded with heavy metals, which not only has inherent performances of activated carbon, such as regulating urban hydraulics, increasing soil fertility, maintaining nutrient and improving microbial habitat, but also has the functions of electric capacity and catalysis.

EXAMPLE

Example 1

As shown in FIG. 1, the system for preventing and controlling heavy metals is provided, and the system is used to control heavy metals in water. An ablation sedimentation tank, a nano-aeration tank and a constructed wetland are provided to connect in sequence. Water to be treated and algae are fed into the ablation sedimentation tank, then the supernatant (the COD is higher than 200 mg/L) is transported to the nano-aeration tank after acidification and digestion. Wherein, nano-bubble water with dissolved oxygen amount of 10~25 mg/L is fed into the nano-aeration tank, and the amount of dissolved oxygen in the nano-aeration tank is maintained at 4-6 mg/L, thus the organic matter is further degraded in the aerobic environment of the nano-aeration tank. The water supernatant after treatment in the nano-aeration tank is fed into the constructed wetland.

There are four layers of fillers in the flow constructed wetland: the first layer of filler at 0-500 cm is a mixed filler of soil and functional biochar, wherein the mixing ratio is 3:7 and the particle size of the filler is 0.10-0.30 cm, and the wetland plants, canna and reed, are planted on it; the second layer of filler at 500-1000 cm is a mixed filler of soil, natural zeolite and limestone, wherein the mixing ratio is 1:2:0.5 and the particle size of the filler is 0.08-0.1 cm; the third layer of filler at 1000-1500 cm is added phosphorus-accumulating bacteria *Pseudomona alcaligenes*, and the third layer of filler is a mixed filler of fly ash molecular sieve (Henan Mingze Environmental Protection Technology Co., Ltd., 13× molecular sieve), Flory diatomaceous earth and biochar, wherein the mixing ratio is 1:3:1 and the particle size of the filler is 0.05-0.08 cm; the fourth layer of filler at 1500-2000 cm is added anaerobic denitrifying bacteria and phosphorus-accumulating bacteria *Pseudomona alcaligenes*, and the fourth layer of filler is a mixed filler of pebbles and biochar, wherein the mixing ratio is 1:1 and the particle size of the filler is 0.30-0.50 cm. Between the third and the fourth layers of filler is filled a polar polymer polyaniline film (obtained according to "Wang Hui. Electrochemical synthesis of polyaniline film photoelectric properties [J]. Journal of Xi'an Jiaotong University, 1999, (08): 107-108").

Example 2~18

Similar to Example 1, with the differences are shown in Table 1 below.

TABLE 1

| Example number | Differences from Example 1 (the substance and order related to the ratio is the same as those in Example 1) |
|---|---|
| Example 2 | The filler in first layer is soil |
| Example 3 | The mixing ratio in the first layer of filler is 1:1 |
| Example 4 | The particle size of the filler in first layer is 0.01~0.08 cm |
| Example 5 | The particle size of the filler in first layer is 5~30 mm |
| Example 6 | The second layer of filler is soil and limestone in original proportion |
| Example 7 | The second layer of filler is soil and natural zeolite in original proportion |
| Example 8 | The mixing ratio in the second layer of filler is 1:1:2 |
| Example 9 | The particle size of the filler in second layer is 0.01-0.05 cm |
| Example 10 | The particle size of the filler in second layer is 1~10 mm |
| Example 11 | The third layer of filler is fly ash molecular sieve and biochar in original proportion |

TABLE 1-continued

| Example number | Differences from Example 1 (the substance and order related to the ratio is the same as those in Example 1) |
|---|---|
| Example 12 | The third layer of filler is fly ash molecular sieve and Flory diatomaceous earth in original proportion |
| Example 13 | The mixing ratio in the third layer of filler is 1:1:1 |
| Example 14 | The particle size of the filler in third layer is 0.005-0.03 cm |
| Example 15 | The filler of fourth layer is pebbles |
| Example 16 | The particle size of the filler in fourth layer is 0.001~0.30 cm |
| Example 17 | No phosphorus-accumulating bacteria is fed in the third and the fourth layers of filler |
| Example 18 | No anaerobic denitrifying bacteria is fed in the fourth layer of filler |

Experimental Example

The effects of the pollutant control methods in Examples 1~18 are evaluated by measuring the content of heavy metals, CODcr, total phosphorus, total nitrogen and pH in the water before and after the treatment. The results are shown in Table 2.

The water used for evaluation is collected from water of Qingshui River (Baoding City). $Pb(NO_3)_2$, $Zn(NO_3)_2$, $Na_3PO_4$ and $NaNO_3$ are added to the water, so that the concentration of Pb in the water is 1.56 mg/L, the concentration of Zn is 3.48 mg/L, and the total content of P is 8.36 mg/L, the total content of N is 23.30 mg/L, the concentration of CODcr is 242 mg/L, and the pH value is 7.22. The treated water is fed directly into the constructed wetland with the inflowing rate of 2.5 L/min and the outflowing rate is 2.5 L/min. The treatment time is 12 h, and the water quality is measured after 12 h.

TABLE 2

| Example number | Pb (μg/L) | Zn (mg/L) | $COD_{Cr}$ (mg/L) | Total P (mg/L) | Total N (mg/L) | pH |
|---|---|---|---|---|---|---|
| Example 1 | 70 | 1.37 | 74 | 1.42 | 4.02 | 7.19 |
| Example 2 | 95 | 1.73 | 160 | 1.80 | 4.23 | 7.21 |
| Example 3 | 75 | 1.48 | 83 | 1.56 | 4.40 | 7.14 |
| Example 4 | 45 | 1.30 | 63 | 2.02 | 4.53 | 6.79 |
| Example 5 | 83 | 1.54 | 98 | 1.50 | 413 | 7.12 |
| Example 6 | 206 | 2.55 | 78 | 1.59 | 3.92 | 7.30 |
| Example 7 | 28 | 0.37 | 83 | 2.23 | 4.78 | 6.11 |
| Example 8 | 127 | 2.20 | 75 | 1.54 | 4.13 | 7.31 |
| Example 9 | 26 | 0.79 | 82 | 2.03 | 4.60 | 7.23 |
| Example 10 | 78 | 1.66 | 75 | 1.78 | 4.29 | 7.20 |
| Example 11 | 82 | 1.43 | 77 | 2.08 | 4.54 | 7.16 |
| Example 12 | 101 | 1.31 | 64 | 1.76 | 4.20 | 7.30 |
| Example 13 | 89 | 1.49 | 87 | 1.96 | 4.36 | 7.23 |
| Example 14 | 58 | 1.23 | 68 | 1.67 | 4.09 | 7.26 |
| Example 15 | 105 | 1.55 | 71 | 1.70 | 4.19 | 7.20 |
| Example 16 | 98 | 1.38 | 74 | 1.82 | 4.38 | 7.23 |
| Example 17 | 79 | 1.47 | 90 | 2.63 | 4.56 | 7.39 |
| Example 18 | 65 | 1.41 | 95 | 2.16 | 5.48 | 7.29 |

As can be seen from Table 2, the decrease in the proportion of functional biochar in the first layer of filler mainly affects the adsorption of heavy metals and the reduction of COD values. When the size of the filler becomes smaller, it is beneficial to the adsorption of heavy metals, because it may affect the air entering the water, thereby reducing the ability of microorganisms to dephosphorize and denitrify. When the size of the filler becomes larger, the dephosphorization and the denitrification of microorganisms are promoted, thus the content of phosphorus and nitrogen decreases, but it has certain adverse effect on heavy metal adsorption.

The decrease in the proportion of natural zeolite in the second layer of filler mainly affects the adsorption and fixation of heavy metals, which causing higher content of heavy metals in the treated system. The pH value in the system is affected by the decrease in the proportion of limestone, and the efficiency of the dephosphorization and the denitrification of microorganisms is reduced, causing higher contents of total nitrogen and total phosphorus in the water. The decrease in the particle size of the filler can significantly improve the adsorption of heavy metals, but it is unfavorable for the regulation of COD, total nitrogen and total phosphorus due to the obstruction of gas flow.

In the third layer of filler, Flory diatomaceous earth is beneficial to microorganisms and its dephosphorization and denitrification, and thus the effect of dephosphorization and denitrification decreases as the proportion of Flory diatomaceous earth decreases. The removal of biochar with excellent adsorption performance has certain impact on the level of heavy metals. And the adsorption of heavy metals can be significantly improved by decreasing the particle size of filler.

In the fourth layer of filler, the level of heavy metals is slightly increased by replacing activated carbon with pebbles, since activated carbon has better adsorption to heavy metals than pebbles. The adsorption performance can be enhanced by decreasing the particle size of the filler, but close packing is not beneficial to the dephosphorization and the denitrification of microorganisms. Therefore, the total phosphorus and total nitrogen levels increase slightly as the particle size of the filler in fourth layer decreases.

Anaerobic denitrifying bacteria and phosphorus-accumulating bacteria have the functions of denitrification and dephosphorization, respectively. For the above reason, the total nitrogen and total phosphorus in the water body are significantly increased when both of them are not added to the water.

In the description of the present invention, it should be noted that the orientation or positional relationship indicated by the terms "over", "under", "inner", "outer", "front" and "rear" is based on the working state of the present invention. and is only for the convenience of describing the present invention and simplifying the description, rather than indicating or implying that the device or element referred to must have a specific orientation, be constructed and operated in a specific orientation, and therefore cannot be construed as limiting the present invention.

The present invention has been described in detail with reference to specific embodiments and exemplary examples, but these descriptions should not be construed as limiting the present invention. Those skilled in the art should understand that, without departing from the spirit and scope of the present invention, various equivalent replacements, modifications, or improvements can be made to the technical solution and its implementation of the present invention, all of which fall within the scope of the present invention. The protection scope of the present invention is subject to the appended claims.

What is claimed is:
1. A system controlling heavy metals comprising:
a constructed wetland (3) is provided with four layers of fillers from top to bottom:
the first layer of filler (13) is a mixed filler of soil and functional biochar, the mixing weight ratio is 3:(6~8), and the particle size of the filler is 0.10-0.30 cm;

the second layer of filler (14) is a mixed filler of soil, natural zeolite and limestone, the mixing weight ratio is 1:(2~3):(0.5~1), and the particle size of the filler is 0.08-0.1 cm;

the third layer of filler (15) is a mixed filler of fly ash molecular sieve, Flory diatomaceous earth and biochar, the mixing weight ratio is 1:(3~4):(1~1.5), and the particle size of the filler is 0.05-0.08 cm;

the fourth layer of filler (16) is a mixed filler of pebbles and biochar, which adsorbs heavy metals, the mixing weight ratio is 1:(1~2), and the particle size of the filler is 0.30-0.50 cm.

2. The system according to claim 1, characterized in that, a sandwich wall is built around the constructed wetland (3) to close the surrounding of the constructed wetland (3), and the interior of the sandwich wall is hollow, in which organic matters (12) which generating heat through fermentation is filled to generate heat by fermentation to supply heat to the constructed wetland (3).

3. The system according to claim 2, characterized in that, the height of organic matters (12) in the sandwich wall is slightly higher than that of the second layer of filler (14) in the constructed wetland, and does not exceed that of the first layer of filler (13).

4. The system according to claim 2, characterized in that, the top of the sandwich wall is open or sealed.

5. The system according to claim 4, characterized in that, when the top of the sandwich wall is sealed, an exhaust pipe is set on the top of the sandwich wall, wherein the exhaust pipe is connected to a water tank to allow hot air in the sandwich wall to feed into the water tank and transport water in the water tank to the constructed wetland (3), thereby providing heat to the constructed wetland (3) by heating water in the water tank.

6. The system according to claim 1, characterized in that, the constructed wetland (3) is provided with water distribution pipes and water collection pipes on both sides along its length, wherein the water distribution pipes are located at the top of the filler layer and the water collection pipes are at the bottom of the filler layer, and the water collection pipes pass through a sandwich wall to output water from the constructed wetland (3).

7. The system according to claim 6, characterized in that, outlet of the water collection pipes is higher than the height of the filler layer in the constructed wetland (3); during operation of the constructed wetland (3) in winter, water is fed from the outlet of the water collection pipes, and when water exceeds the water distribution pipes by about 1 m, the water feeding is stopped, so that 0.4-0.6 m of an ice layer and an air insulation layer are formed outside the filler layer of the constructed wetland (3); and then water to be treated is transported by the water distribution pipes.

8. The system according to claim 6, characterized in that, both the water distribution pipes and the water collection pipes are made of PVC (polyvinyl chloride).

9. The system according to claim 8, characterized in that, the water distribution pipes and the water collection pipes are made of DN100 mm-DN120 mm PVC; water is evenly distributed by the water distribution pipes with a hole every 10-20 cm, and the diameter of the hole is 1-3 cm; the water collection pipes are provided with a water collection hole along the length of the constructed wetland (3) corresponding to the middle section of the filler, and the water collection hole is provided every 5-10 cm, and the diameter of the water collection hole is 1-3 cm.

10. The system according to claim 1, characterized in that, a polar polymer film is filled between the third layer of filler (15) and the fourth layer of filler (16), so that anaerobic or anoxic environment is formed in the area where the fourth layer of filler (16) is located;

phosphorus-accumulating bacteria is added in the third layer of filler (15) for dephosphorization of water;

phosphorus-accumulating bacteria and anaerobic denitrifying bacteria are added to the fourth layer of filler (16) for dephosphorization and denitrification of water;

a plurality of airway tubes (17) with vent holes on a wall are longitudinally inserted in the constructed wetland (3).

11. The system according to claim 10, characterized in that, the airway tubes (17) are inserted into the area from the first layer of filler (13) to the third layer of filler (15), so that gas is exchanged between the inside of the filler layer and the outside thereof.

12. The system according to claim 10, characterized in that, the polar polymer film is polyaniline film.

13. The system according to claim 1, characterized in that, functional biochar in the first layer of filler (13) is prepared from wetland plants enriched with the heavy metals, and the system includes the following steps:

step 1, wetland plants are cultured in a culture solution with the heavy metals, and the culture solution contains copper chloride, zinc chloride, and nickel chloride with a molar ratio of 32:9:9, and then the wetland plants enriched with copper, zinc and nickel are obtained;

step 2, the plants are crushed, and then maintained at 900-1600° C. for 120 min in an inert environment, thereafter the temperature is reduced from 1200° C. to 20° C. within 200 min, thereby carbonizing to obtain activated carbon;

step 3, the activated carbon is washed with distilled water until the water is clear after washing, thereafter 30-50 wt. % zinc chloride is added to the washed activated carbon until a liquid level is higher than the activated carbon, then the mixture is stirred, radiated with a microwave of 300 W-700 W for 20~30 min and soaked at 25° C. overnight, thereby obtaining the activated carbon after activation;

step 4, the activated carbon after activation is dried, and a 10 mmol/L~30 mmol/L solution of sodium borohydride is added dropwise to reduce the metal ions in the activated carbon, and then the activated carbon is washed with distilled water and dried, thereby obtaining functional biochar.

\* \* \* \* \*